United States Patent [19]
Laffra et al.

[11] Patent Number: 5,832,270
[45] Date of Patent: Nov. 3, 1998

[54] SYSTEM HAVING AUTOMATIC INSERTION OF HOOKS INTO OBJECT-ORIENTED SOFTWARE FOR VISUALIZING EXECUTION THEREOF

[75] Inventors: Johannes Christiaan Laffra, Ossining; Ashok Malhotra, Croton-on-Hudson, both of N.Y.

[73] Assignee: International Business Machines Corporation, Armonk, N.Y.

[21] Appl. No.: 824,673

[22] Filed: Mar. 26, 1997

Related U.S. Application Data

[63] Continuation of Ser. No. 264,663, Jun. 23, 1994, abandoned.
[51] Int. Cl.$^6$ ...................................................... G06F 9/45
[52] U.S. Cl. ............................................................ 395/703
[58] Field of Search ................................... 395/701, 702, 395/703, 704, 705

[56] References Cited

U.S. PATENT DOCUMENTS

| | | | |
|---|---|---|---|
| 5,247,651 | 9/1993 | Clarisse | 395/500 |
| 5,307,498 | 4/1994 | Eisen et al. | 395/700 |
| 5,420,968 | 5/1995 | Johri | 395/133 |
| 5,454,086 | 9/1995 | Alpert et al. | 395/375 |
| 5,483,468 | 1/1996 | Chen et al. | 364/551.01 |

OTHER PUBLICATIONS

Stroustrup et al., "The Annotated C++ Reference Manual," Addison–Wesley Publishing, Reading, MA, Ch. 12, pp. 261–306, 1990.

Marc H. Brown, "Exploring Algorithms Using Balsa–II" (DEC Research Systems Center) IEEE 1988 Computer May 88'pp.14–30.

John T. Stasko "Tango:A Framework and System for Algorithm Animation" (Georgia Inst. of Technology) IEEE 1990 Computer Sep. 1990 pp. 27–39.

*Primary Examiner*—Emanuel Todd Voeltz
*Assistant Examiner*—Peter J. Corcoran, III
*Attorney, Agent, or Firm*—Louis J. Percello; Ronald L. Drumheller

[57] ABSTRACT

Object-oriented system methods are automatically instrumented with method hooks that are capable of generating graphical information that can be visualized on a graphical interface. When a method hook is run, it can indicate the occurrence of: an object instance being created, and object instance being destroyed, an method being entered or a method being exited. In the event of one of these occurrences, the method hooks initiate execution of a monitoring function that uses the graphical information and a visualization script with rules to update a visualization shown on the graphical interface. The update will conform with the current state of the object instances visualized. The rules can be changed, to modify the visualization, without recompiling or relinking the application programs. Constraints also can be used by the monitoring function to modify the visualization.

7 Claims, 5 Drawing Sheets

SYSTEM HAVING AUTOMATIC INSERTION OF HOOKS INTO OBJECT-ORIENTED SOFTWARE FOR VISUALIZING EXECUTION THEREOF

This is a continuation of application Ser. No. 08/264,663, filed Jun. 23, 1994, now abandoned.

FIELD OF THE INVENTION

This invention relates to the field of visualizing the execution of software systems with particular emphasis on visualizing object-oriented software.

BACKGROUND OF THE INVENTION

In the area of computer programming, it is often desirable to be able to visualize the execution of a computer program on a graphical interface. The visual display presented on the interface is sometimes used to show a user the workings of algorithms for the purpose of exposition or understanding. Visualization of the execution of object oriented systems has been discussed to some degree in the prior art. Typically these visualization systems address the following questions:

How does the user select which aspects of the program state of the object-oriented system should be visualized?

How should each of the selected aspects be represented?

When should the selected aspects be displayed?

When should the display be refreshed?

Balsa (IEEE Computer, Vol. 21, No. 5, May 1988, pp.14–36) discloses procedure calls that are added to capture significant events in the program. Each event is distributed to one or more visualization processes which create and update the graphical displays that constitute the visualization. However, this is an essentially manual process. Special code has to be written by hand and compiled and linked with the application to create the visualization. If the purpose of the visualization is debugging, then the code has to be removed after the bugs are found and corrected: a process that may lead to other bugs.

TANGO (IEEE Computer, Vol. 23, No. 9, Sep. 1990, pp.27–39) discloses a number of object classes such as locations, images, paths and transitions that can be used to specify the events as well as the visualizations. However, the process, still remains essentially manual although the predefined objects simplify the process to some extent.

OBJECTS OF THE INVENTION

An object of this invention is an improved system and method that allows a user to simply and easily create a customized visualization for an object-oriented software system.

Another object of this invention is an improved system and method for customizing the visualization of object-oriented software executing on a computer for the purposes of program design, debugging, and inspection as well as for teaching and learning.

SUMMARY OF THE INVENTION

The present invention is an efficient system and method for visualizing the internal workings of object-oriented software.

An object-oriented system has application programs that have one or more object classes. Each of these object classes has one or or more object instances with variables. The variables have values that define the state of the object instance. The object classes also have methods that can change the state of an instance by changing the variable values.

These methods are instrumented with method hooks that are capable of generating graphical information that can be visualized on a graphical interface. The method hooks are novelly added by an automatic technique. When a method hook is run, it can indicate the occurrence of: an object instance being created, an object instance being destroyed, a method being entered or a method being exited. In the event of one of these occurrences, the method hooks initiate execution of a monitoring function that uses the graphical information and a visualization script with one or more rules to update a visualization shown on the graphical interface. The update will conform to the current state of the object instances visualized. The rules can be changed, to modify the visualization, without recompiling or relinking the application programs or without any manual changes to the source code. Constraints also can be used by the monitoring function to modify the visualization.

DETAILED DESCRIPTION OF THE INVENTION

Figure 1:
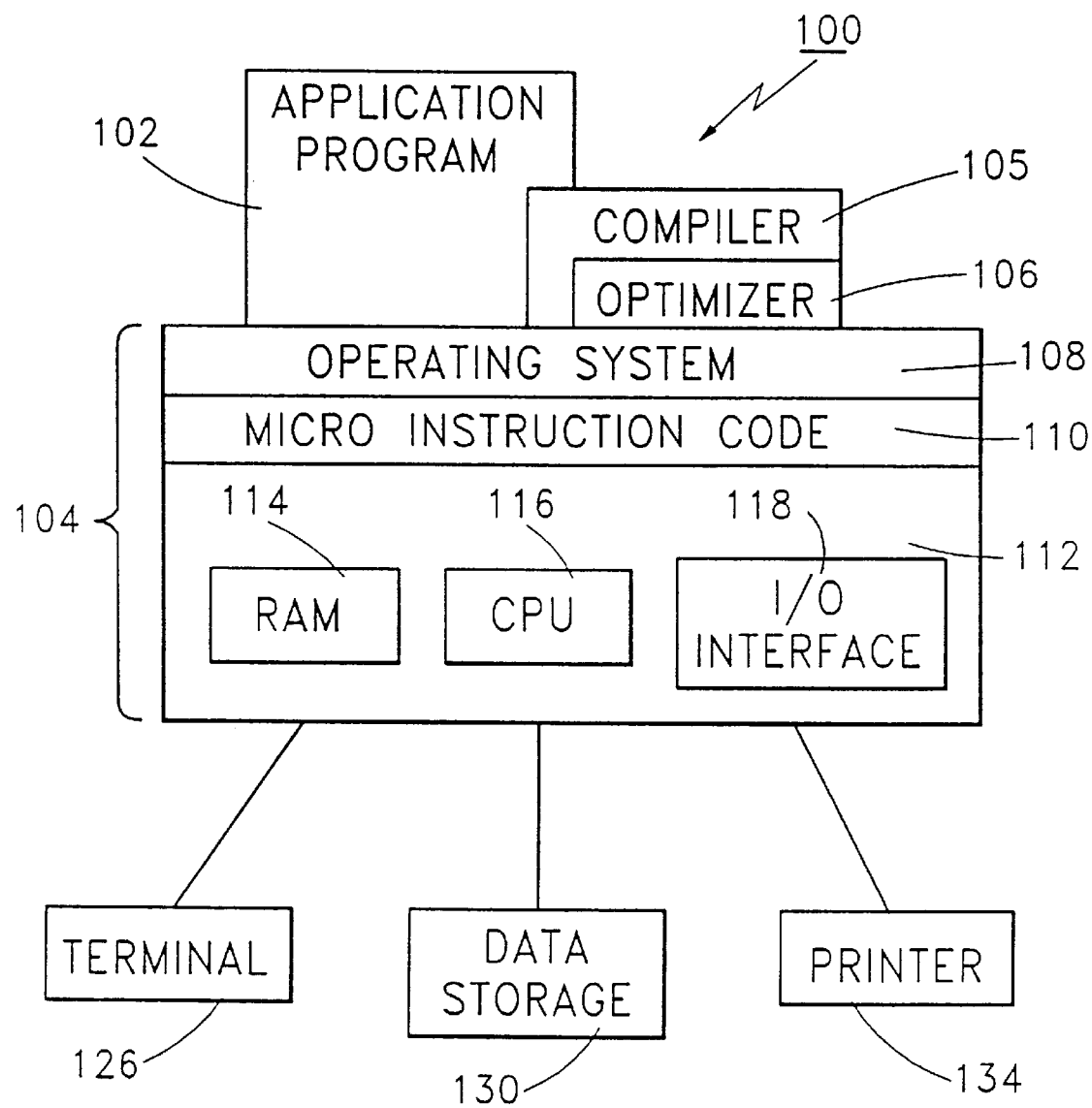
FIG. 1 is a block diagram of a computer system executing the present invention.

FIG. 1 is a block diagram showing a computer system 100 on which a preferred embodiment of the present invention operates. The preferred embodiment includes one or more application programs 102. One type of application program 102 is a compiler 105 which includes an optimizer 106. The compiler 105 and optimizer 106 are configured to transform a source (like other application programs 102) program into optimized executable code. More generally, the source program is transformed to an optimized form and then into executable code. The compiler 105 and optimizer 106 operate on a computer platform 104 that includes a hardware unit 112. The hardware unit 112 includes one or more central processing units (CPU) 116, a random access memory (RAM) 114, and an input/output interface 118. Micro-instruction code 110, for instance a reduced instruction set, may also be included on the platform 104. Various peripheral components may be connected to the computer platform 104 including a graphical display terminal 126, a data storage device 130, and a printing device 134. An operating system 108 coordinates the operation of the various components of the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100 that are within the contemplation of this invention.

The invention specifically pertains to object-oriented systems. Thus, one or more of the application programs 102 would be object-oriented applications. The compiler 105 and the optimizers 106 would have the capability to process an object-oriented computer language, e.g., C++ or Smalltalk. Object- oriented systems are well known in the art.

Figure 2:
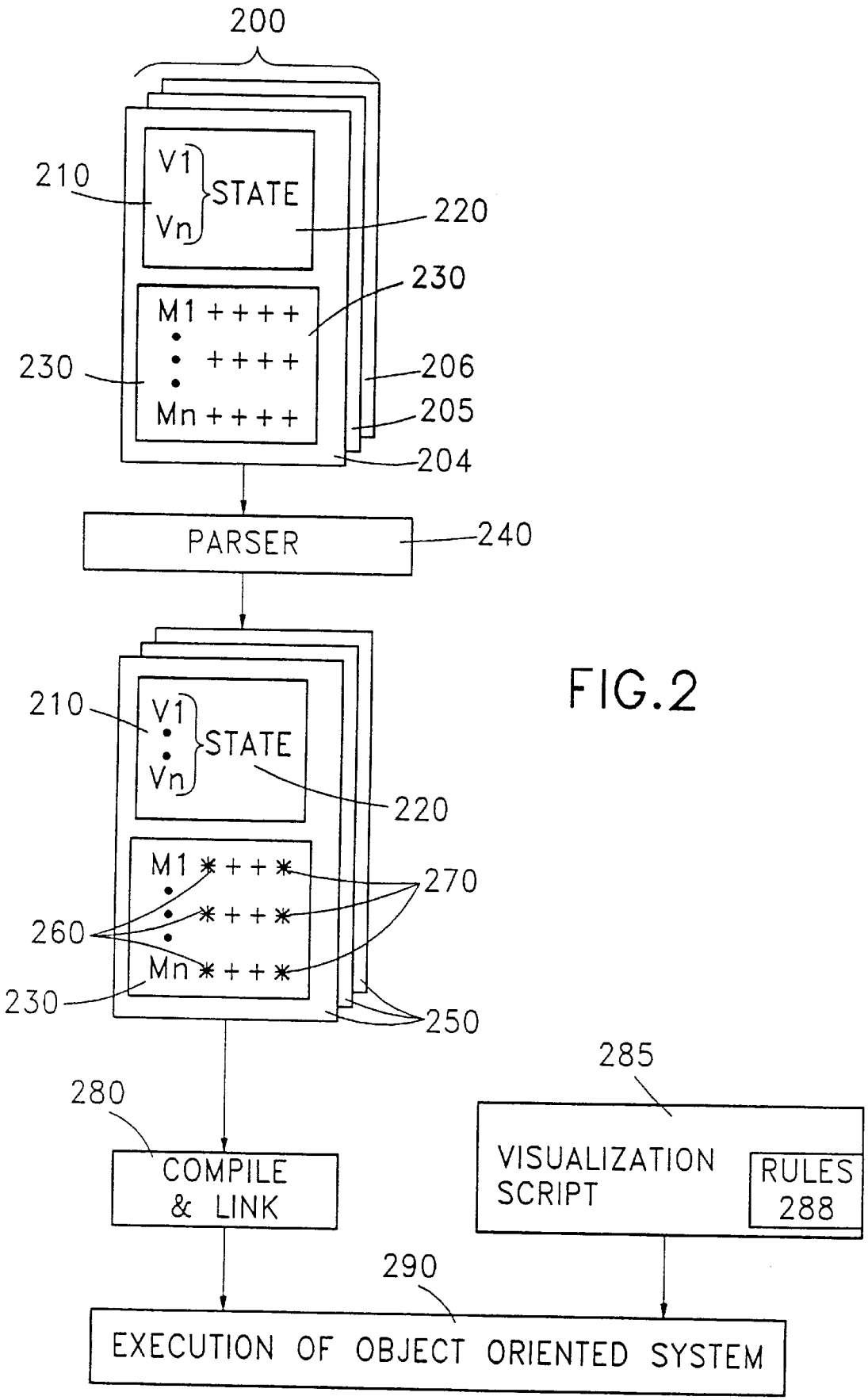
FIG. 2 is a diagram showing how one or more object classes are modified to create the novel structures of the present invention.

FIG. 2 is a block diagram showing the structure of one or more objects in an object-oriented system and how they are modified to create a structure that is used in the present invention.

An object class 200 typically has a plurality of object instances, typically 205. Each object instance 205 comprises one or more variables 210. The set of variables 210 in the instance is defined as the state 220 of the object instance. The instances 205 in the class have the same variable definition (i.e., variable type and number) but the variables in each instance can have different values at run time. Therefore, the state of a given instance is also defined at run time by the actual values of its instance variables.

An object class 200 further contains one or more methods 230 that can operate on each instance that resides in the object class. A method 230 is a collection of executable statements that may change the state of the instance 205 in the class 200 for which the method 230 is executed. Therefore, at run-time a method changes the state of an instance by changing the value of the one or more of the instance variables in the instance variable set 210 defining the state of the instance.

The methods of any object class can be called to execute in many ways. These include calls by other methods 230 in the same object class 200, calls from instances 205 in other object classes 200, and/or call sites outside the object-oriented system. In other words, the methods 230 can be called using any known prior art procedure.

To further illustrate, a typical object class might be called Employee 200. The object class Employee 200 might represent information about all employees in a company. The plurality of instances 205 would be a set of records about individual employees and could include a first instance 204 through a last instance 206. Each instance consists of a set of instance variables 210 (also called members or attributes 210) with given values. The values describe the particular employee associated with the instance. For example, the variables name and employee number and salary might be the set of variables 210 of the instance and therefore would also define the state 220 of the instance describing a given employee.

The object-oriented structures described above are well known.

In the present invention, a parser 240 initially "reads" the definition of the methods of one or more of the object classes 200 in the object-oriented system in order to determine where to novelly insert method hook (260 and 270) data structures. In a preferred embodiment, the parser 240 reads the source code of the object class definition (i.e., the source code of the definitions of variables and methods), to be able to find locations in the source code to insert method hooks (260 and 270). The parser 240 analyzes the source code by first determining the beginning and the end of the each method by using indications in the method syntax, e.g., by recognizing a beginning and an end delimiter on each method. Typically, these delimiters are object-oriented language dependent, e.g., in C++ the delimiters used are "{" and "}". Other indications (delimiters) might be used in different object-oriented languages. Alternative, the parser 240 can place method hooks only at the start of the method 260.

For example, in the object-oriented language C++, a method hook can be created by inserting a declaration of a variable on the stack. This variable is created when the enclosed body of C++ code (i.e., the method 230) is executed, and deleted when the method terminates. The variable is of a special type, so that when the variable is created, a special piece of code (called "constructor" in C++) will be executed (which will form hook 260). In addition, special code will be executed when the variable is deleted again (called the "destructor" in C++). Therefore, the creation and deletion of the variable will be done each time the method is run. Another preferred way of inserting hooks after compilation is described below.

Figure 3:
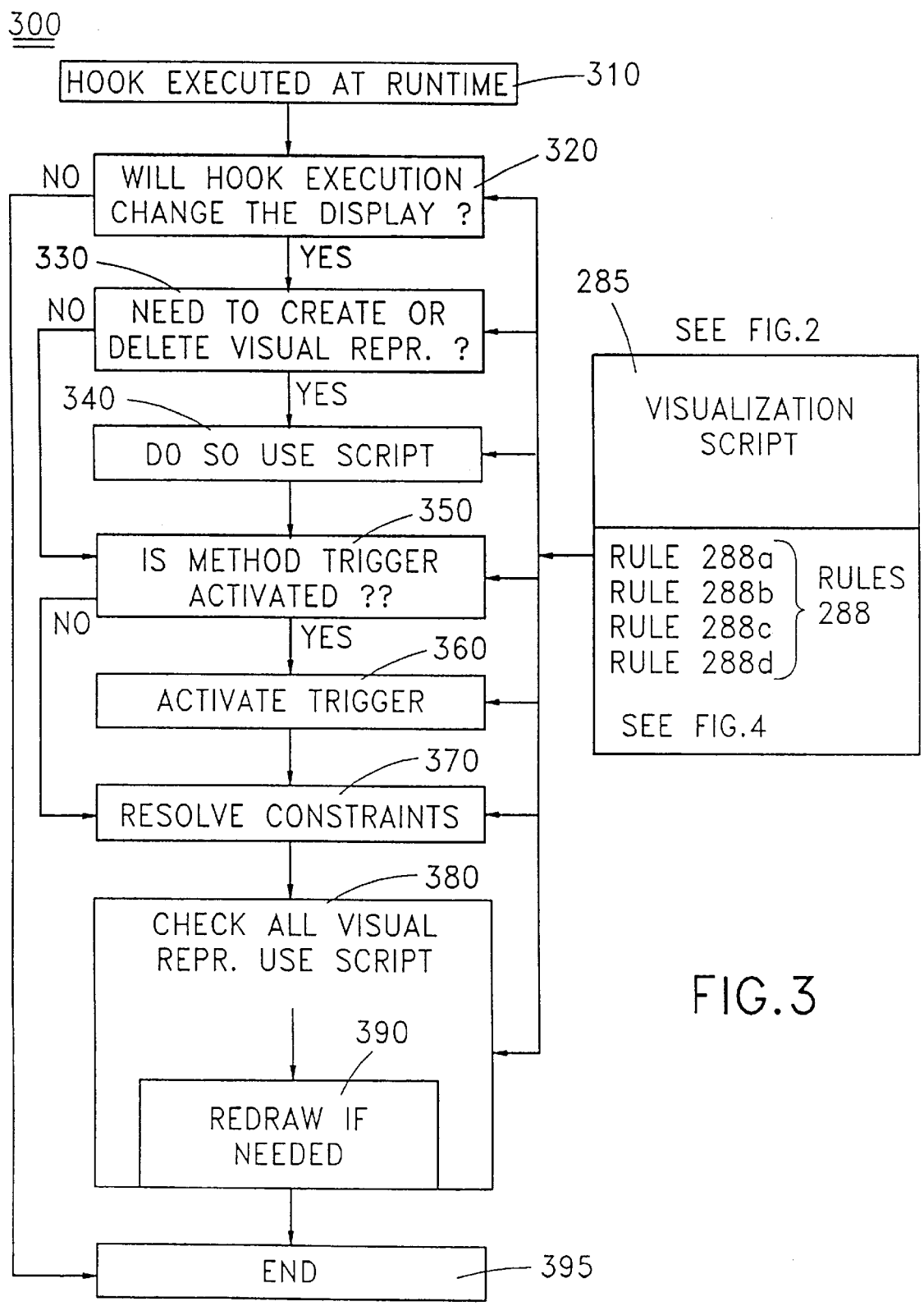
FIG. 3 is a flow chart of the steps of the present method.

The hooks take the form of executable code that is used to pass information to a monitoring function (see FIG. 3). The information is passed each time an instance of an object class of interest in an object-oriented application program is created or deleted and each time a method in the object class of interest is entered or left. An object class of interest is a class into which hooks have been inserted.

In addition, there may be certain conditions placed on the passing of this information. For example, calls from can be collected in a buffer and to be handled together after a certain number is selected.

An example C++ class definition with three instance variables and one method could like like:

```
1. class Employee {
2.     char *name;
3.     int employee_number;
4.     float salary;
5.     void RaiseSalary(int);
6. };
7. void Employee::RaiseSalary(float new_salary)
8. {
9.     salary = new_salary;
10. }
```

When instrumented with parser 240 the definition of the method 230 defined at lines 7 to 10 could be modified into:

```
7. void Employee::RaiseSalary(float new_salary)
8. {
8a.    _SPECIAL_HOOK_TYPE_hook(this, "Employee::RaiseSalary",
8b.                                  new_salary);
9.     salary = new_salary;
10. }
```

The code on lines 8a and 8b form the hook code for method 230. Each time the method RaiseSalary is called on an instance of type Employee, its salary will be updated and the statement on lines 8a and 8b is executed, which is a declaration of a variable on the stack. As describe above, the execution of this statement will result in a call to the monitoring function (described in FIG. 3), both when the method is entered and when it is left. This is how hooks can be inserted in a C++ program, to detect the execution of methods 230. When executed these methods can manipulate instances, i.e., make modifications to their variables 210.

In another preferred embodiment using C++, the parser 240 can also place hooks in the constructor and destructor of a given class. The constructor and destructor are special C++ methods which are executed when an instance of that class is created and deleted again. Thereby, the method hooks 260 and 270 in the constructor and destructor indicate when instances are being created and deleted. If either the constructor or destructor are not defined in the class definition, the parser 240 can generate the constructor and destructor with an inserted method hook(s).

While parsing the class definition, the parser 240 can also generate run time type facilities, allowing the instance variables of an object instance to be inspected and/or modified at runtime.

The parser can operate on one or more object classes in the object-oriented system. The selection of which classes will be instrumented (the ones which will have hooks inserted) is left to the user. Only classes that are instrumented can be visualized in the graphical interface 126 at run time.

After inserting, the hooks 260 and 270 the instrumented code will be compiled and linked 280 using techniques well known in the art.

In some systems, the instrumentation can be done after compilation 280, whereby the instrumentation is done directly on executable code. This is done by patching the executable code, by finding in the executable code the beginning and end of a given method, and by inserting the executable versions of hooks 260 and 270 respectively, directly in the executable code. In this process, the parser 240 will be a parser which will work on the executable code. Furthermore, existing compilers for object-oriented programming languages can be enhanced to generate the hooks 260 and 270 directly for the purpose of this invention.

In yet other preferred embodiments, the execution of class methods may be done in an interpretive mode, by using well known techniques. In that case the hooks 260 and 270 may be executed from within the interpreter. This can be the case for object-oriented languages such as Smalltalk. This process will eliminate the need for the parser 240.

Parser 240 will novelly instrument an object class 200, to create a structure(s) 250, forming the original class definition together with the inserted hooks 260 and 270, as described above. In this way, the object class is instrumented without any manual effort.

Before the executable code 290 is run, a novel visualization script 285 is prepared by the user, and used by executable code 290. The script 285 will tell the monitoring function (FIG. 3) how to interpret the information which is generated by the hooks 260 and 270. The visualization script interpretation process is described in FIG. 4.

The visualization script 285 is a collection of rules 288 in readable source code of a novel form. The visualization script 285 identifies one or more object classes and specifies how to display instances of those object classes on the display 126. This specification is done using the visualization script rules 288. (See also FIG. 4, blocks 410 to 450.) For example, if the visualization shown on the graphical display shows the salaries of all the employees of a given department, the visualization script might contain rules to display salaries of individual employees as one bar in a bar graph. This could be done by having one rule create a window with a title "Employee Salaries." Another rule would create one bar for one employee (object instance) where the height of the bar is a function of salary. Another rule (or the same rule) might color the bar red if the employee's salary is higher than the manager's. Therefore, a set of rules like this for each employee instance would create a bar graph of salaries for each employee (instance) in the department. Note that the visualization script is passive. It is merely a specification that is selectively run by the monitoring function.

FIG. 3 is a flow chart of one preferred embodiment of a monitoring function 300 used by the present invention. The monitoring function receives information generated by hooks 260 and 270, when they are executed at runtime. The information that is gathered by the monitoring function is then visualized on a graphics display, guided by the set of rules 288, to be found in the visualization script 285. Each time a particular hook is executed, the monitoring function 300 will inspect the current display and the script. The monitoring function 300 then modifies the display depending on the hook and the visualization script. As described before, the hook 260 or 270 can notify the creation or deletion of an object instance, of the entrance or leaving of a particular method, executed on an instance. Depending on the nature of the hook, different actions may be taken by the monitoring function. If the hook notifies creation or deletion of an instance, the visualization script 285 will be used to generate or remove a visual representation of the instance on the display. If the hook notifies the execution of a method, the display may need to be updated, when the representations of objects created in the past no longer correctly visualize the state of their corresponding instances. Namely, during the execution of one or more methods, the state of an instance may have been updated, and if a representation of the object is available on the graphics display, it may need to be redrawn to reflect this state change.

After a method hook (260, 270) is executed indicating that a method has been entered or exited or that an object instance has been created or deleted, the monitoring function 300 is run. The monitoring function selectively evaluates part or all of the visualization script (described in FIG. 4) to determine how to build and/or modify a display of the visualization of the object-oriented system on the graphical interface 126. The monitoring function 300 performs several tasks determined by the rules 288 in the visualization script. These tasks include: 1. determining if the changes made by the conditions causing the monitoring function to run are to be visualized, 2. determine how the visualization is to be modified, 3. modifying the visualization using the visualization script, and 4. enhancing the modifications if certain constraints are met.

In step 310, the monitoring function 300 is executed when an executable version of one of the method hooks 260 or 270 is run at runtime.

In step 320 the monitoring function determines if the changes caused by entering or exiting a method or the creation or deletion of an object instance causes a change in any object instance that is to be visualized. That is the case when object instances are currently represented on the graphics display, and their current state is no longer correctly reflected in the visualization. In a preferred embodiment, the monitoring function uses a visualization script 285. The visualization script defines rules 288 for the representations of object instances on the graphical interface. If the monitoring function 300 is called by a method hook in an object class that is referenced in the visualization script, that object class might be displayed or may need to be modified on the graphical interface 126 at run time. Whether or not object classes are to be displayed on the graphics display is determined by providing visualization rules 288 in the appropriate visualization script 285. Exchanging a given visualization script with different rules may produce a different visualization of the object-oriented program, without the need of recompilation or relinking of the source code.

If the method hook will not result in a change of the graphics display, the monitoring function jumps to step 395, and returns.

If the activated hook notifies the creation of a new object instance, the next step 330 will check to see if the visualization script has rules for the visualization for this object instance. If that is not the case, the monitoring function 300 skips to the next step 350. If the script does have rules for visualizing this newly created instance, the script is used to actually generate the required visualizations 340. For example, by using a given rule 288, an object instance of class Employee may be represented as a rectangle, where the height of the box is a function of the salary of the employee. In addition, by using another rule 288, a text label may be generated close to the rectangle, to display the name of this employee. Now, each time an object of the class Employee is created, a hook is executed in the constructor for its type, the monitoring function 300 is notified, and the visualization script 285 is used to find the two rules to visualize the given employee. After visualizing the employee, the display may need to be updated at a later stage, if for instance, the salary of the employee gets updated. That will happen in step 320. In this example, the box representing the salary of the employee will need to be updated. If the name of the employee stays the same, the label need not be redrawn.

If the activated method 300 notifies the deletion of an existing object instance, and a visualization for this instance has been generated in the past, step 330 will delete the visualization for this object instance. If this is not the case, the monitoring function skips to the next step 350. In the Employee example, both the rectangle and the label need to be removed from the graphics display.

Step 350 checks whether method triggers have been activated. The visualization script 285 can contain special rules 288, that can specify the user's interest in the execution of a given method (see also 450 in FIG. 4). The method trigger rule identifies a class name, a method name, and whether the user is interested in entering this method (corresponding with hook 260) or leaving this method (hook 270). If the script contains a rule that matches the activation of the hook 310, the activation code for the trigger is executed in 360 (using the appropriate rules 288 in the visualization script 285). If the script does not contain one or more rules that match the currently activated hook, the monitoring function 300 skips to step 370. Method triggers can be used to, for instance, count the number of times a given method is executed, and to update the display when a certain threshold has been reached. Furthermore, method triggers can be used, for example, to change the display when a given method is entered, for instance by coloring a visual item red, and to reset the display when the method is left again, for instance by coloring the visual item back to green.

Figure 4:
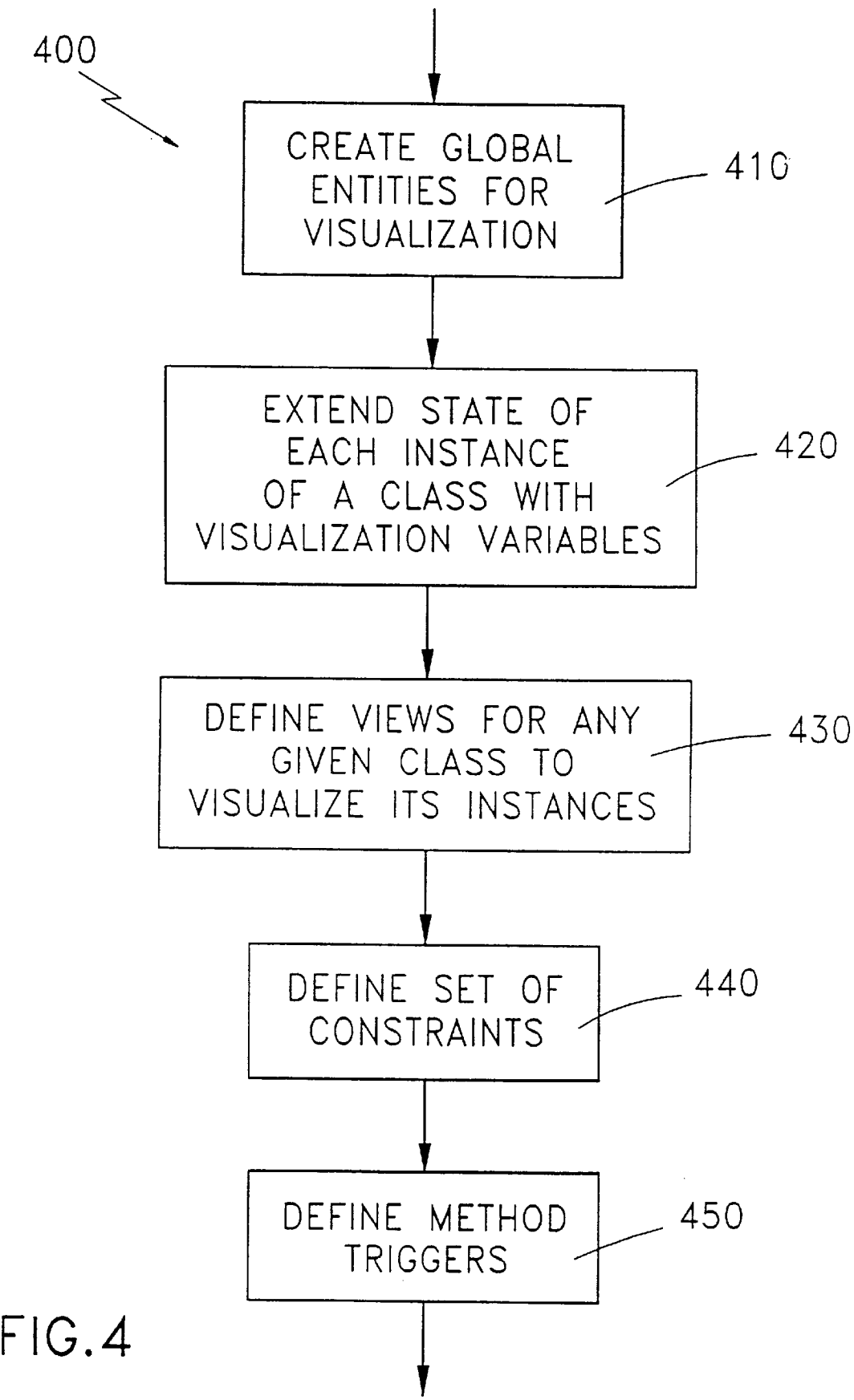
FIG. 4 is a flow chart of the steps of relating object instances with displayed views.

At step 370, the monitoring function resolves the set of constraints possibly defined by the script (see 440 in FIG. 4). The resolution of the constraint rules may result in updates to visualization variables, thereby influencing the display. If no constraints are defined, step 370 will have no effect.

At step 380, the display will actually be updated. Each visual representation that has been created in the past, during the execution of the monitoring function, and that is still active, will be checked. The set of one or more visualization rules 288 for any given object instance is re-examined, and each of the parameters for the representation is recomputed, using the script 285. The value for each of the parameters of the visual representation can be a function of one or more visualization variables (possibly updated by method triggers or constraints). Alternatively, the value of a parameter can be a function of one or more instance variables of the instance that this visual representation is linked to. When 380 detects that a visual representation will differ from a previous computation, it will be redrawn in 390.

In a preferred embodiment, various optimizations to process 380 can be envisioned. The visualization script can be transformed into an internal datastructure, facilitating faster comparisons between specification and actual values. Furthermore, the display can be updated at a different rate (to collect a number of changes into one). In addition, well known techniques in computer graphics and animation, such as double buffering, morphing, and smoothing can be used to change the transition of one representation to another.

FIG. 4 shows the possible actions that can be taken according to syntactical elements available in the visualization script language. First, in 410, one or more global entities for defining the visualization shown on the graphical interface 126 can be generated. The rules for the entities are executed whenever the script becomes active, and are deleted when the script becomes inactive. Typically, the script becomes active when the instrumented program is activated, and inactive when the program stops. The global entities created in 410 are given a name. They have a type, either basic types well known in general programming languages (including, but not limited to, integer, character, and string), or from a set of visual elements (including, but not limited to, window, rectangle, circle, and text). Elements of a basic type are initialized with an initial value from the domain of the type of the element. Elements of a visual type are defined by a set of one or more parameters. The value for each parameter is given by an expression using well known functional operators (including, but not limited to '+', '−', and '*'), referring a combination of one or more constant values and/or one or more global entities. The specification of the rule is declarative, meaning that the monitoring function in FIG. 3 will have to ensure that the actual display of the visual entity is according to current values for any of the global entities. Whenever one of the global entities that a given visual entity depends on changes value, the display of the visual entity will be done automatically. The user only specifies once what the entity should look like, not how to manage changes to the display. In a preferred embodiment, global visual entities are typically used as a display (when the type is window), or as decorations in a window (for explaining what the visualization is all about).

Syntactical elements 420 can be activated when a given object instance is created. In that case, the state of the instance can be extended with one or more extra instance variables, known as local variables, which will only be active in the context of the visualization environment. Local variables are referred to by name and have a type, similar to the global visual entities in 410. When the type of a local instance is a one of the visual entities, the value of its parameters may depend on a combination of one or more constant values, and/or one or more global entities, and/or one or more local variables, and/or one or more instance variables (210) from the state of the instance (see 220 in FIG. 2).

Syntactical elements 430 can be activated when a given object instance is created. In that case, the object instance can be represented by one or more visual entities or views. Elements of a visual type are defined by a set of one or more parameters. The value of these parameters may depend on a combination of one or more constant values, and/or one or more global entities, and/or one or more local variables, and/or one or more instance variables (210) from the state of the instance (see 220 in FIG. 2). Whenever one or more of the elements on which one or more of the parameters depend on change value, the representation will be recomputed and redisplayed (see FIG. 3).

Syntactical elements 440 form a set of constraints. Constraint-based programming is a well known declarative technique for limiting the domain of a given set of variables. In this case the constraints can be defined over global variables or local variables. A constraint defines a relationship over two sets of variables. The relationship is declarative (defined once by the user and resolution is left to the constraint system. 370, part of the monitoring function 300). Constraints take the form of two operands and one operator. The operands are expressions over global variables, and/or local variables, and/or constant values, and/or instance variables, and/or well known numerical operands. The operator is a comparison operator (such as '<', '>=', and '=='). Whenever a given constraint is invalidated, the constraint resolver 370 will change one or more of the global or local variables, until the entire set of constraints form a valid set of constraints. See FIG. 5 for an example of the use of a constraint rule 288 in a given visualization script 285.

Syntactical elements 440 allow the specification of one or more method triggers. A method trigger refers to a class name, and a method name, and defines what to do when hooks 260 or 270, executed at runtime (310), match this trigger. Hooks 260 and 270 mention the class name and the method name. When the class name of the hook matches the class name of the trigger, and the method name of the hook matches the method name of the trigger, the trigger matches the hook, and the corresponding action is executed. The action that is executed comprises assigning new values to global variables or local variables. In some preferred embodiments actions may also be the generation of a given tone on a audio device, or the activation of a sleep statement—resulting in a delay of the visualization, or any aspect influencing the currently running visualization.

Visualization scripts can be generated textually by a user directly, by using a well known text editor or word processor. Alternatively, the actual visualization script can be generated by a computer program. For instance, an interactive tool, which may be referred to as a visual script builder, may generate a script from a specification given by the user in the form of a drawing, or any other technique. The drawing would specify the rules for defining the visualization. In yet other preferred embodiments the script can be generated (semi-)automatically from knowledge inferred from, for instance, design information about the program. In the latter cases, the script will not directly function as specification language, but rather as a communication medium between different program development tools.

The following shows a sample linked list object class in C++. This example class is used to explain FIG. 5.

```
class List {
public:
    int value;
    List *next;
    void SetValue(int value);
    List(List *, int);
};
```

The class List has two instance variables, an integer value and a pointer to the next element of the list next. The class List has two methods, SetValue() (which will update the instance variable value) and List() which creates an instance of the class List with a given value and a pointer to the next element in the list.

In our sample program, 6 instances of the class List are created, initialized with a random initial value, and linked together into a well known linked list datastructure. After creation, the program will sort the linked list, such that the values of the nodes in the linked list form a ordered collection of integer values.

The following is a sample script that may be used to visualize the linked list when it is executed at runtime:

```
1. GLOBAL  Sort     Window 400 400 600 200
2. LOCAL   List x   Integer 570
3. TYPE    List     Box Sort x 50 9 value "black" 1 "gray80"
4. INSURE  List     x < next.x-15
```

In the example, as allowed in 410 in FIG. 4, line 1 creates a global window called Sort to display the visualization, locating the window at position (400,400), and giving it the dimensions 600 by 200 pixels, using well known addressing techniques in window system technology.

Using syntactical element 420 described in FIG. 4, line 2 extends the state of each instance of the class List with a local variables used in the visualization. In the example, line 2 specifies an integer variable called x with an initial value of "570". This variable is added to every instance of the class List.

Using syntactical element 430 described in FIG. 4, line 3 of the example defines a box to be displayed in the Sort window. The horizontal position of the box is value of the x variable defined in line 2. Its vertical position is a constant "50". The width of the box is constant "9", and its height is the value of the value instance variable. The rest of line 3 specifies other attributes of the box such as the color and width of the border, and the fill color of the box. Line 4 applies constraints defined on the view. Essentially, line 4 limits the value of the x variable for this instance as a function of the x variable of the next instance. This results in the box for this instance being drawn at a fixed distance from the box for the next instance in the linked list.

Figure 5:
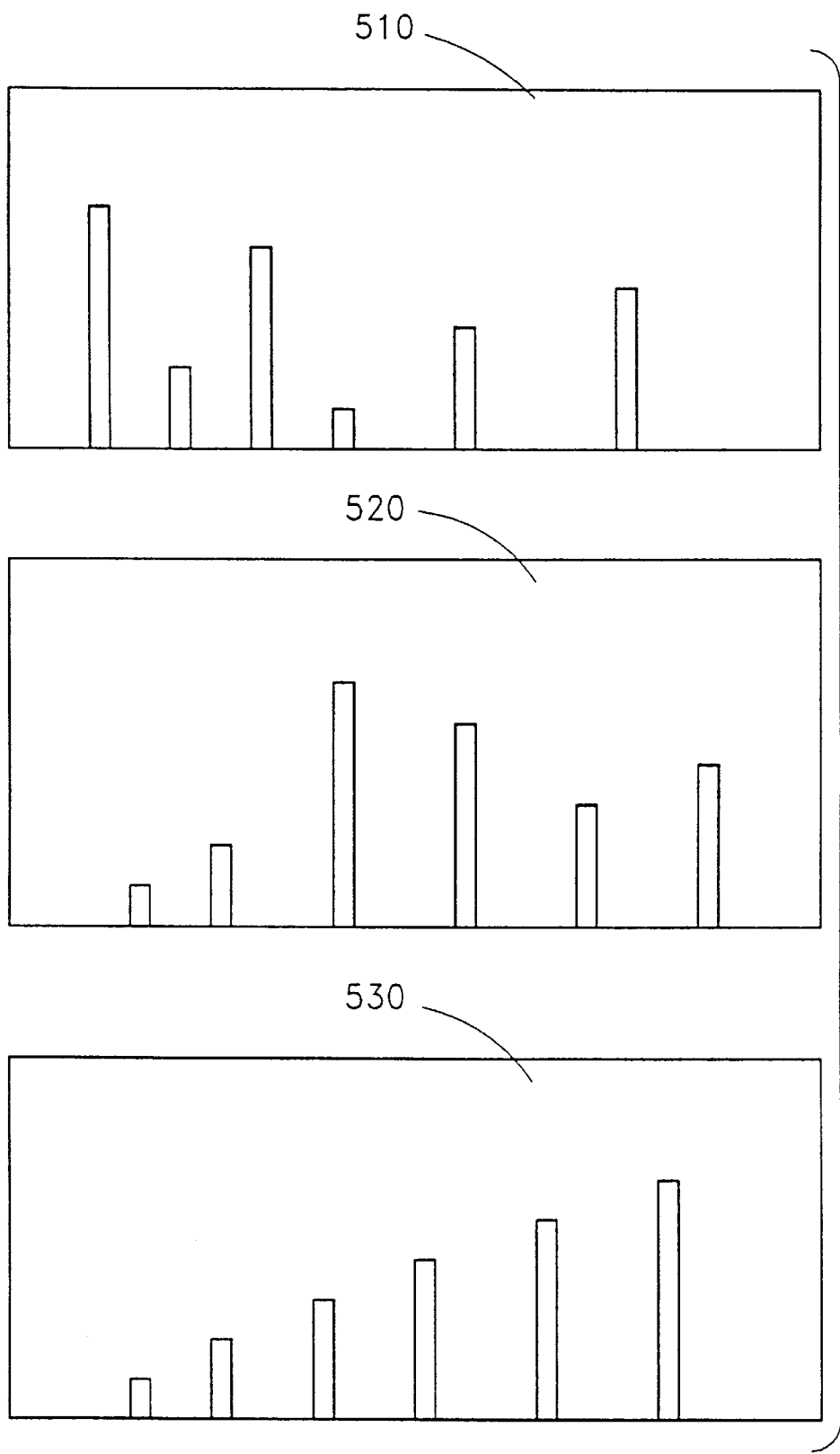
FIG. 5 is a drawing of a display generated by the visualization script.

FIG. 5 shows three views of the linked list. The top view 510 shows the visualization of the list during initialization of the data structure. The middle view 520 shows a possible visualization of the list while the sorting algorithm is in progress. The lowest view 530 shows a visualization of the list after the algorithm has sorted it.

Given this disclosure, one skilled in the art could develop other equivalent embodiments that are within the contemplation of the inventors.

We claim:

1. A computer system for visualizing the execution of an object-oriented program on a graphical interface of the computer system comprising:

an object-oriented application program capable of executing on the computer system, the application program having an object class of interest, said object class of interest having a plurality of object instances, each said object instance having at least one variable, the variables each having a value, the values of the variables for each object instance forming a variable set that defines a state of said each object instance, said object class of interest further including a multiplicity of methods, a first one of said methods being a constructor method for creating an additional object instance in the object class of interest, a second one of said methods being a destructor method for deleting an object instance in the object class of interest, and a third one of said methods being a collection of statements which can be applied to any object instance in the object class of interest to change the state thereof by changing the values in the variable set of said any object instance;

computer means for automatically modifying the object-oriented application program by automatically detecting each instance of any one of said multiplicity of methods in said object-oriented application program and automatically inserting a method hook data structure into each of said detected methods at either one of, or both, the beginning and end of each said detected method;

a visualization script that contains rules corresponding to each of said first, second and third methods, the visualization script defining a visualization modification on the graphical interface corresponding to each of said first, second and third methods; and a monitoring function that is run when any one of the method hook data structures is executed, the monitoring function using the visualization script to update the visualization on the graphical interface by incorporating the visualization modification corresponding to the executed method hook data structure.

2. A system, as in claim 1, where the method hook data structures are inserted by a parser.

3. A system, as in claim 2, where the method hook data structures are inserted after compilation.

4. A system, as in claim 1, where the method hook data structures are inserted by an interpreter.

5. A system, as in claim 1, where the visualization is updated to show a change of state of one or more object instances.

6. A system, as in claim 1, where the visualization is updated in a way that satisfies one or more constraints.

7. A system, as in claim 1, where the rules can be changed independent of the implementation and execution of the application programs.

* * * * *